June 20, 1961  JEAN-PHILIPPE CROUZET  2,989,049
ARRANGEMENT FOR PROTECTION AGAINST COLD AND INCLEMENT WEATHER
Filed May 1, 1958
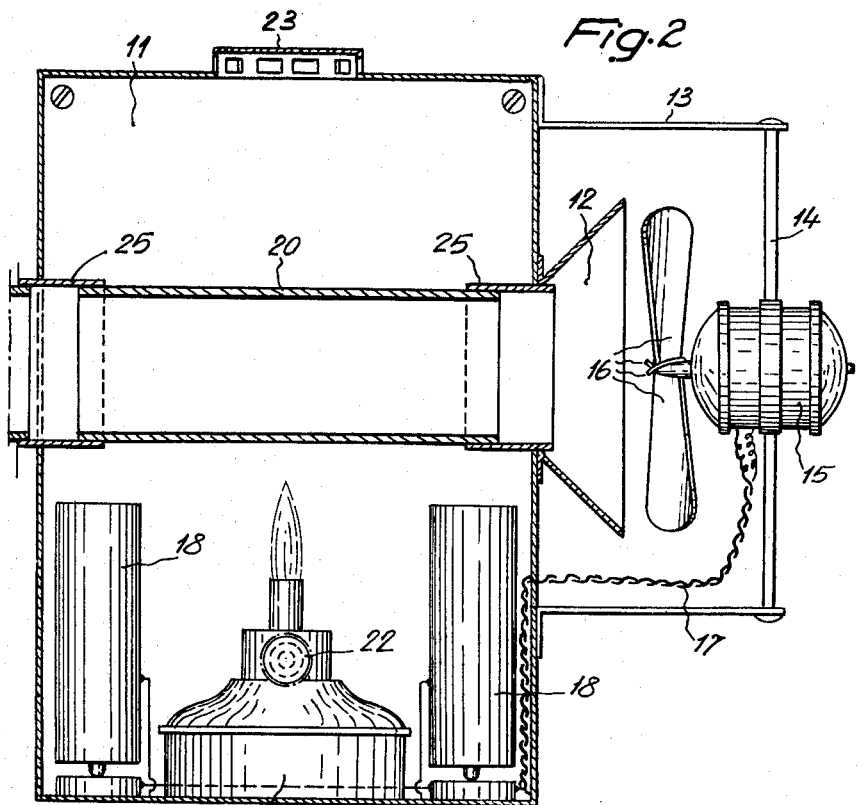
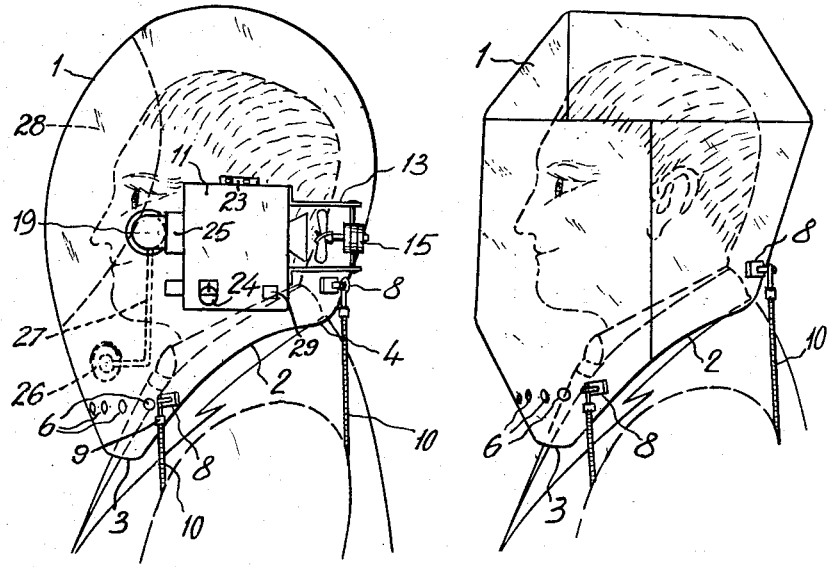

2,989,049
ARRANGEMENT FOR PROTECTION AGAINST COLD AND INCLEMENT WEATHER
Jean-Philippe Crouzet, 112 Quai Louis Bleriot, Paris, France
Filed May 1, 1958, Ser. No. 732,402
Claims priority, application France Nov. 22, 1957
3 Claims. (Cl. 126—208)

The present application is a continuation in part of my prior application Ser. No. 648,252 filed on March 25, 1957, and entitled, "Arrangement for Protection Against Cold and Inclement Weather."

My invention has for its object a helmet protecting the wearer against inclement weather and particularly against the cold of the surrounding atmosphere.

It is more particularly but not exclusively intended for pedestrians, cyclomotorists and drivers of vehicles on which the driver is not sheltered, such as agricultural tractors and machines.

My improved arrangement is constituted chiefly by a transparent rigid casing surrounding the head of the wearer and bearing through its open lower opening over the shoulders of the wearer, the upper part of his back and of his chest, while furthermore the front surface of the casing is provided with ports through which the outer air required for breathing purposes enters inside the casing. Such an arrangement forms around the head of the wearer a closed chamber protecting against the wind and enclosing a mass of air the temperature of which is substantially higher than the temperature of the surrounding atmosphere by reason of the heat insulation provided by said casing.

It includes preferably attaching means for securing it in position, and constituted chiefly by two eyebolts positioned on the rear part of the casing to either side of its vertical plane of symmetry together with two eyebolts positioned similarly on the front part of the casing so as to allow securing to said eyebolts the ends of so-called Sandow chest-expanders passing underneath the arms of the wearer.

However since the breathing inside said helmet is slightly less easy than in the open air, it is of interest to produce inside the casing a slight overpressure through the introduction into it of compressed air. Similarly, an increase in temperature by 12 to 16° C. with reference to outer atmosphere, as provided by mere thermal insulation may be insufficient under severe cold weather conditions and, on account of this, I provide a channel for admitting air into the casing and a fan driven by a small electric motor fed by an electric cell. The admission of said air includes a metal heat exchanging section operating between the air thus blown into the transparent casing of the arrangement and a heat generator of any known or suitable type. Preferably, said heated generator is of the type constituted by a spirit lamp.

I will now describe a preferred embodiment of my improved arrangement, reference being had to the accompanying drawings, wherein:

FIG. 1 is a lateral elevational view of the protecting means incorporating a fan and a heat-exchanger.

FIG. 2 is a detailed sectional view of the fan and heat-exchanger system forming part of the arrangement shown in FIG. 1.

FIG. 3 shows a modification of the first embodiment in side elevational view.

The arrangement illustrated in FIG. 1 is constituted by a generally egg-shaped casing or shell 1 made of transparent plastic material resisting inclement weather such as the plastic material sold in trade under the registered name "Plexiglas" or "Rhodoïd" in sheets. The shell may be molded and made of a single part or two parts welded together along a vertical meridian line (FIG. 1) in which case it is constituted by two stamped "Plexiglas" sheets of a thickness of about 1.5 mm. (FIG. 1) or else it may include a single cut and folded sheet of "Rhodoïd" of a thickness of about 9/10 mm. the edges of which are welded, glued or hooked together (FIG. 3).

Before use, it is necessary to coat at least the front part of the inner surface of the casing with a nonfatty product preventing the deposit of moisture. Such a coating 28 is shown on an enlarged thickness in FIG. 1.

The lower part of the casing forms an opening the shape of which is such that it allows an accurate fitting over the shoulders of the wearer's coat without any gap therebetween, which result is obtained by reason of the general shape given to the arrangement and of the outline given to the edge of the opening.

The protecting arrangement according to my invention rests on the shoulders 2, on the upper section of the wearer's back 4 and on the latter's chest 3.

The apparatus is provided in the embodiment illustrated with a row of eight holes 6 each having a diameter of 13 mm. and distributed so as to form gaps of 17 mm. from edge to edge. The inner edges of the two medial holes lie at 12 mm. from the front medial vertical line of the casing, while the distances separating the peripheries of said openings in the row from the lower edge of the front surface of the casing are equal respectively to 36, 39, 40 and 44 mm. for the first, second, third and fourth holes starting from the medial line respectively.

Four eye-bolts 8 are secured inside the lower section of the arrangement, respectively in the rear part and in the front part of the latter, to either side of the vertical diametrical plane. These eye-bolts have securing attachment hooks 9 for elastic straps 10 which are fitted underneath the arms of the wearer, so as to ensure the proper positioning of the apparatus on the latter.

The tie of each eye-bolt is necessarily strengthened with a square of "Rhodoïd" of a thickness of 1.4 mm., 2 cms. inside, settled in the helmet.

In the areas, where snow falls may be expected daily, a peak secured slightly above the level of the wearer's eyes is of interest.

Means are provided laterally of the casing for ensuring an increase in pressure and a heating of the air. These means include a metal case 11 having say a breadth of 8 cms., a height of 17 cms. and a length of 12 cms.; said case is secured to one side of the main casing through four nut and screw systems, so that the hinged door of the metal case may lie outwardly and open forwardly, while it seems to rest on the wearer's shoulders.

The bottom of the metal case is at the same level as the rear area of the casing adjacent the opening in the latter. In the outer wall of the metal case is provided a port of a diameter of 4 cms. its periphery lying at about 10 cms. from the bottom of the metal case. To said port and on the outside of the metal case is secured a funnel 12 having a diameter of 4 cms. and opening over a distance of 23 mm. to form at its outer end an opening of 8 cms. in diameter.

Two lugs 13 of a length of 7 cms. and of a breadth of 35 mm. are welded through one of their edges respectively to the upper and to the lower part of the outer wall of the metal case. Between the free ends of said lugs 13 is fitted a tie-rod 14 carrying a small electric motor 15 of 4.5 volts. Said motor drives a fan 16 including four thin blades, of a diameter of 8 cms. The mean front surface of the fan lies at 1 cm. from the outer surface of the funnel. Said electric motor is fed through leads 17 by electric cells 18 of 4.5 volts housed inside the lower part and laterally of the metal case. A switch which is not illustrated is provided in the electric leads 17. The electric cells which are held in a vertical location by metal uprights are fitted upside down, so that the wires connecting them in parallel lie at the bottom of the metal case and are protected against the action of the heating flame.

When the motor revolves, the fan projects air into a pipe 19 of a diameter of 4 cms. extending horizontally through the metal case and opening through a bent part into the shell of the actual casing.

Inside the metal case, the pipe 19 includes a section 20 made of an aluminium tube of a wall-thickness of 1 mm. while its length is equal to 9 cms.

The interior of this tube may involve one or several aluminium diametrical partitions or wings in order to increase the thermal exchange with the flowing air.

Said section 20 opens into the adjacent tube section and into the pipe 19 through collars made of air tight fused silica as shown at 25. Said packings or rings may also be made of porous silica impregnated with a silicon varnish resisting temperatures up to 250° C., earthenware or else by rings of plastic material or glass annuli of a grade which is not brittle and melts only at high temperatures.

The remainder of the pipe 19 including its bent part is made of plastic material. It may also be made with the same material as the second collar (special glass, fused silica, etc.) and be an extension of it. Lastly, there is housed inside the casing a small spirit lamp 21 in which the height of wick may be adjusted through operation of the knob 22. The height of the lamp is at the utmost equal to 40 mm. and its fuel is constituted by 90% methylated spirit.

When the lamp is lit underneath the tube section 20, it is found that it heats the air passing through the pipe in a highly satisfactory manner without it being necessary in fact for the flame to touch the pipe. For instance, when the upper section of the flame lies at 5 mm. underneath the tube section, the temperature of the air rises by more than 30° C. above the temperature assumed by it at the input end of the pipe.

Through the knob or handle controlling the wick of the lamp 21, it is possible to adjust the temperature of the air as desired with an accuracy equal to 1° C.

I obtain thus within the shell the desired temperature which may be verified by a small thermometer 26 positioned inside said shell and suspended from a wire 27 secured to the inner end of the pipe 19.

The thermic level of the heat exchanger constituted by the tube section 20 is thus excellent.

In the lower part of the metal case, e.g. in the lower part of the hinged door, is provided an opening 29 for entry of the combustion air and in the upper part a chimney 23 allows the combustion gases to escape.

A small ring 24 is secured to the door of the metal case in registry with another ring, so as to allow an easy opening of said door.

The metal members adapted to be connected with the electrodes of the electric cells should be fitted inside an electric insulator which is not liable to be damaged by heat.

The heater hereabove described can be combined in the same manner with the helmet shown in FIG. 3.

The embodiment described hereinabove by way of example is adapted to be modified to various extents, without unduly widening the scope of the present invention as defined in the accompanying claims.

What I claim is:

1. A head gear for protection against cold and inclement weather comprising a transparent rigid casing open at its lower end, so as to form a lower edge adapted to engage the shoulders and the upper part of the back and of the chest of the wearer, openings located in the lower end of the front part of the casing, means affixed on a lateral wall of the rigid casing for feeding into said casing air at a raised temperature and including a fan, an electric motor driving said fan, a pipe extending between said fan and the inside of the casing and a heat generator carried by the casing and adapted to heat a part of said pipe between the fan and the casing, and straps affixed on the lower parts of the casing and adapted to pass underneath the arms of the wearer for maintaining the edge of the casing on the shoulders and upper part of the back and chest of the wearer.

2. A head gear for protection against cold and inclement weather comprising a transparent rigid casing open at its lower end so as to form a lower edge adapted to engage the shoulders and the upper part of the back and of the chest of the wearer, openings located in the lower end of the front part of the casing, means affixed on a lateral wall of the rigid casing for feeding into said casing air at a raised temperature and including a fan, an electric motor driving said fan, a pipe extending between said fan and the inside of the casing and through which said fan is adapted to blow air into said casing, said pipe including a metal section, a flame producing burner adapted to heat through the metal section of the pipe the air blown through same, and straps affixed on the lower parts of the casing and adapted to pass underneath the arms of the wearer for maintaining the edge of the casing on the shoulders and upper part of the back and chest of the wearer.

3. A head gear for protection against cold and inclement weather comprising a transparent rigid casing open at its lower end, so as to form a lower edge adapted to engage the shoulders and the upper part of the back and of the chest of the wearer, openings located in the lower end of the front part of the casing, means for feeding air at a raised temperature into the casing and including a fan, an electric motor driving said fan and a pipe extending between the fan and the inside of the casing and through which said fan is adapted to blow air into said casing, said pipe including a metal section, a flame-producing burner adapted to heat through the metal section of the pipe the air blown through same, an auxiliary case provided with a combustion air opening at its lower part and with exhaust gas outlet openings at its upper part and enclosing the burner and the metal section of the pipe and carrying the fan and motor, said auxiliary case including a wall secured to the casing electric cells carried inside the auxiliary case and an electric circuit operatively connecting said cells with the motor and straps affixed on the lower parts of the casing and adapted to pass underneath the arms of the wearer for maintaining the edge of the casing on the shoulders and upper part of the back and chest of the wearer.

References Cited in the file of this patent

UNITED STATES PATENTS

| | | |
|---|---|---|
| 912,527 | Batter | Feb. 16, 1909 |
| 1,148,902 | Jacobs | Aug. 3, 1915 |
| 1,164,351 | Hultstrom | Dec. 14, 1915 |
| 2,427,673 | Holthouse | Sept. 23, 1947 |
| 2,445,487 | Lester et al. | July 20, 1948 |

FOREIGN PATENTS

| | | |
|---|---|---|
| 501,717 | Italy | Nov. 25, 1954 |